Jan. 30, 1923.
A. G. RADKA.
TRUCK BRAKE.
FILED APR. 22, 1921.
1,443,825.
2 SHEETS—SHEET 2.
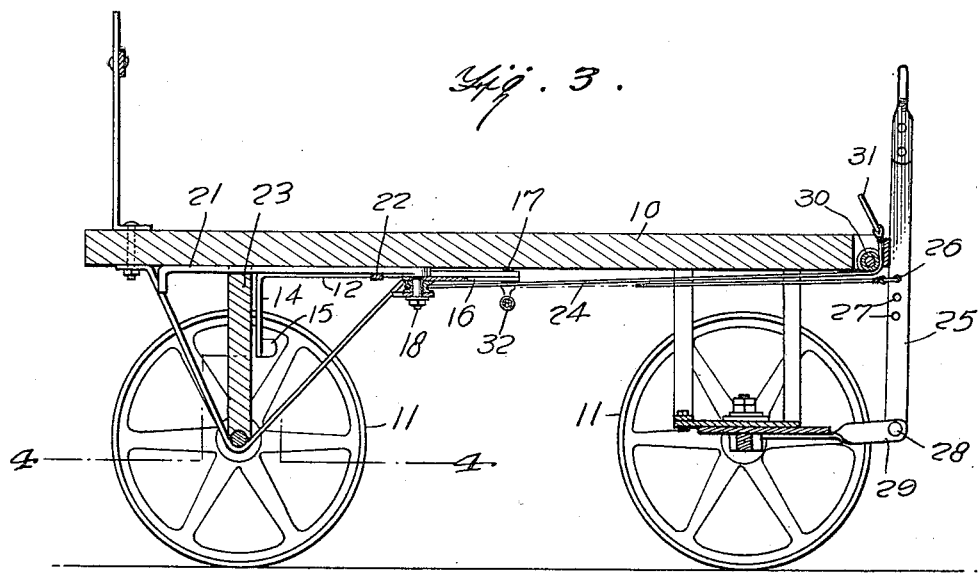
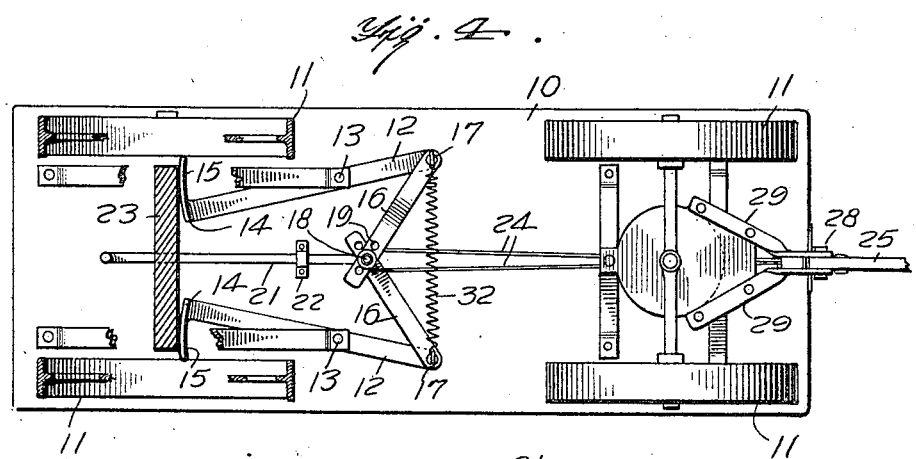
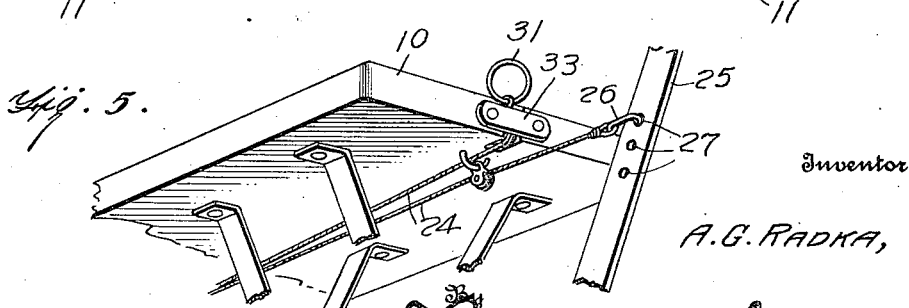
Inventor
A. G. RADKA,
Attorney Patented Jan. 30, 1923.

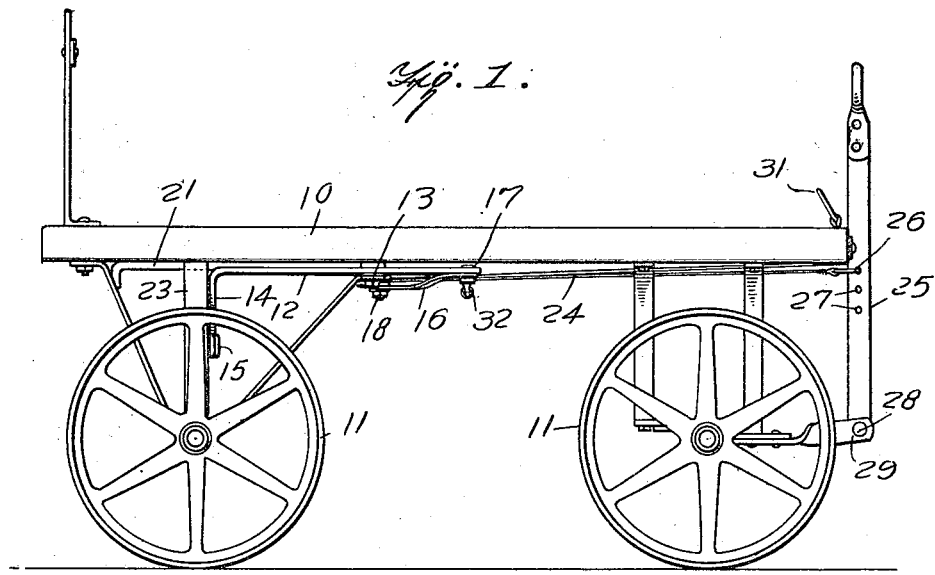
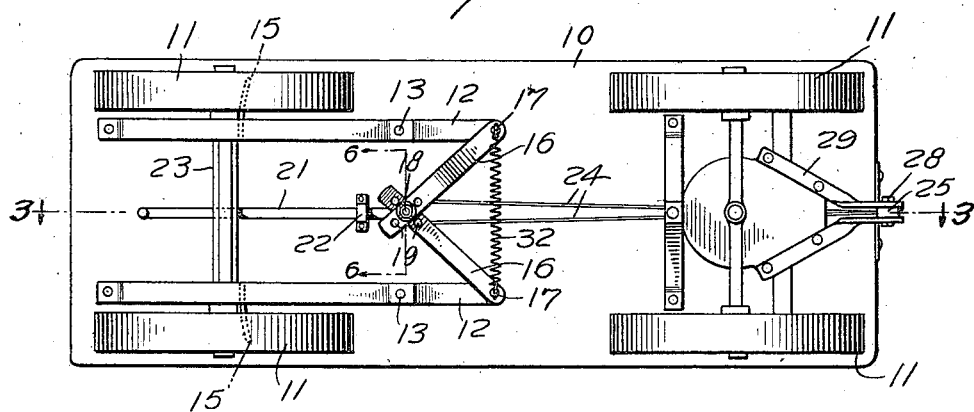
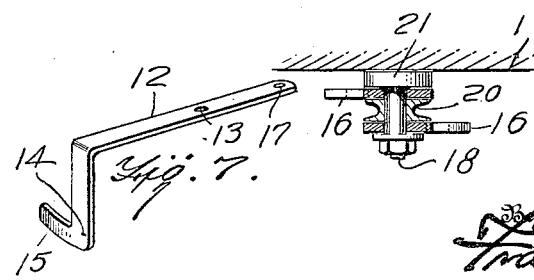

1,443,825

UNITED STATES PATENT OFFICE.

AUGUST G. RADKA, OF NEWTON, KANSAS.

TRUCK BRAKE.

Application filed April 22, 1921. Serial No. 463,456.

*To all whom it may concern:*

Be it known that I, AUGUST G. RADKA, a citizen of the United States, residing at Newton, in the county of Harvey and State of Kansas, have invented certain new and useful Improvements in Truck Brakes, of which the following is a specification, reference being had therein to the accompanying drawings.

This invention relates to brakes for trucks and the like and has for an object to provide means which will automatically retain a truck against movement when the draft lever or tongue is released and which will likewise automatically release such retaining means when draft is applied to the tongue.

A further object of the invention is to provide in combination with a truck having the usual body and supporting wheels of swinging arms adapted to engage the wheels between the spokes to prevent rotation of some of the wheels with connecting means from said swinging arms to the tongue whereby the movement of the tongue in the direction of the draft releases the retaining means.

A further object of the invention is to provide in combination with a wheeled truck of swinging arms adapted to engage one or more of the wheels and retain such wheels against rotation with connecting means to the tongue or other draft means for automatically releasing the retaining means, and auxiliary means for manually controlling the action of the brakes irrespective of the position of the draft tongue.

With this and other objects in view, the invention comprises certain novel elements, units, parts, mechanical movements, functions and combinations as disclosed in the drawings together with mechanical equivalents thereof as will be hereinafter more fully described and claimed.

In the drawings:

Figure 1 is a view of a conventional truck in side elevation with the present invention applied thereto.

Figure 2 is a view in inverted plan of a truck with the invention thereon.

Figure 3 is a longitudinal vertical sectional view through a truck carrying the present invention.

Figure 4 is an inverted plan view showing the invention upon a truck with the brake out of engaging position, some of the parts being broken away to show the position and operation of other parts.

Figure 5 is a perspective view of the under part of the forward end of the truck showing the arrangement of the operating cables.

Figure 6 is a detail fragmentary view of the roller forming the pivot of the operating levers.

Figure 7 is a perspective view of one of the brake arms.

Like characters of reference indicate corresponding parts throughout the several views.

The present invention is adapted to be applied to trucks or wheeled vehicles of various types and the showing of a conventional truck with body 10 and wheels 11 is intended as no limitation upon the present invention but only explanatory thereof. At any convenient point upon the vehicle, arms 12 are pivoted as at 13 and have downwardly turned elbows 14 and extremities 15, the latter being properly positioned to swing into the circle of one of the wheels 11 and occupy a position between the spokes of the wheel. As shown, two of these arms 12 are employed but it is to be understood, of course, that the invention is in no way limited to two.

To the ends of the arms 12 bars 16 are pivoted at 17 and are pivoted together by a pivot pin 18. The pivot pin 18 is preferably adapted to engage in any of the several perforations 19 in the bars 16 and to carry a roller 20 interposed between said bars. It is also preferably rigidly secured to a guide 21 which extends along the body 10 through a keeper 22 and through a second guiding means as through a perforation in the bolster 23. The alignment of the keeper 22 and the perforation in the bolster 23 insures the longitudinal movement of the guide 21 and therewith the roller 20 and the pivot pin 18, insuring the co-ordination of the arms 16.

About the pulley 20 a cable 24 is employed extending forwardly, one end being attached to the tongue 25 in any approved manner as by the link 26 occupying any of the several perforations 27 in said tongue. The tongue is pivoted at 28 to the hounds 29 in substantially the usual and ordinary manner.

The other end of the cable 24 passes about a pulley 30 journaled in the forward end of the body 10 and is provided with any approved type of hand hold as the ring 31. A spring 32 extends between the pivot points 17 and the arms 12 and the proportion of the cable 24 and spring 32 is such that the spring normally holds the arms 12 with the points 15 in engagement with the wheels and holds the ring 31 in engagement with the keeper 33 whereby the tongue 25 is elevated to the position shown at Figures 1 and 3. When the tongue is moved downwardly about its pivot 28 as is necessary to draw the vehicle, the cable 24 draws upon the pulley 20 drawing forward the arms 16 to expand the arms 12 whereby the extremities 15 are moved from the engaging position shown at Figure 2 to the inoperative position shown at Figure 4 which permits the movement of the truck in the usual manner without interference. When the tongue 25 is released, the spring 32 acting upon the pivots 17 forces the bars 16 rearwardly to the position shown at Figure 2, thereby elevating the tongue to the position shown at Figures 1 and 3.

It occasionally happens that it is found desirable to move the vehicle without engagement with the tongue 25. Provision is made for this in the cable 24 passing over the pulley 30 and terminating in the ring 31. The manual lifting of the ring 31 operates upon the cable in exactly the same manner as does the moving of the tongue 25 as just hereinbefore described. It is obvious, therefore, that the device automatically applies the extremities 15 to the wheels to prevent rotation thereof when the parts 25 or 31 are in normally released position. The application of draft to the tongue 25 in the usual well known manner automatically releases the brake without difficulty so that the vehicle presents no difficulties in the way of mobility by reason of the brakes being applied thereto when stationary.

What I claim is:

1. The combination with a truck embodying a body and supporting wheels of a pair of spaced arms pivoted to the body and having extremities proportioned to engage between spokes of some of the supporting wheels, a draft tongue pivoted to the forward end of the body, a cable extending from the arms to the tongue whereby the application of draft to the tongue swings the arms out of engaging position, a spring adapted to move the arms into engaging position when the tongue is released, and auxiliary manual means for releasing the engagement of the arms without movement of the draft tongue.

2. The combination with a truck embodying a body and supporting wheels of arms pivotally spaced beneath the body having extremities adapted to swing into locking engagement between the spokes of the wheels, a spring interposed between the arms adapted to yieldingly hold the extremities in such locking position, bars pivoted to the arms, a draft tongue, a cable extending from the bars to the draft tongue whereby the application of draft to the tongue operates to swing the arms out of engaging position, and auxiliary manual means for actuating the cable.

3. The combination with a truck embodying a body and supporting wheels of arms pivotally spaced beneath the body and having extremities adapted to swing into locking engagement between the spokes of some of the wheels, a spring engaging the arms adapted to yieldingly hold the arms in such locking position, a toggle formed between the arms, a draft tongue, a cable extending from the draft tongue to the toggle whereby the application of draft to the tongue acts through the toggle to swing the arms into unlocked position, and manual means for applying unlocking actuating stress to the cable without application of draft to the tongue.

In testimony whereof I hereunto affix my signature in presence of two witnesses.

AUGUST G. RADKA.

Witnesses:
  HENRY E. STAHL,
  K. A. RICHERT.